United States Patent

[11] 3,584,281

[72] Inventors John R. Reeves
Trafford;
Larry J. Moorhead, West Mifflin, both of, Pa.
[21] Appl. No. 811,372
[22] Filed Mar. 28, 1969
[45] Patented June 8, 1971
[73] Assignee Westinghouse Electric Corporation
Pittsburgh, Pa.

[54] DC MOTOR REVERSING SYSTEM INCLUDING PROTECTIVE FEATURES RESPONSIVE TO REVERSING SELECTOR AND TO DYNAMIC BREAKING CURRENT
13 Claims, 1 Drawing Fig.

[52] U.S. Cl. .................................................... 318/258,
318/284, 318/380
[51] Int. Cl. ...................................................... H02p 3/12,
H02p 5/00
[50] Field of Search ........................................... 318/261,
284, 368, 257, 258, 376, 380

[56] References Cited
UNITED STATES PATENTS

| | | | |
|---|---|---|---|
| 2,881,284 | 4/1959 | Mekelburg .................. | 318/284X |
| 2,990,506 | 6/1961 | Montross ..................... | 318/284 |
| 3,230,435 | 1/1966 | Andrews ...................... | 318/284 |

Primary Examiner—Oris L. Rader
Assistant Examiner—K. L. Crosson
Attorneys—F. H. Henson, C. F. Renz and A. S. Oddi

ABSTRACT: A braking and reversing system for a DC motor is disclosed wherein a series controlled switching device and a multiposition selection switch are connected between the motor and the power supply. To effect reversal of the motor, the selection switch is placed in a reverse position which prevents the power supply from providing an output, the series controlled switching device to be turned off and a brake controlled switching device to be turned on. The activation of the brake device inserts a dynamic braking circuit in series with the motor and also prevents the power supply from supplying an output and prevents the controlled switching device from turning on regardless of the setting of the mechanical switch.

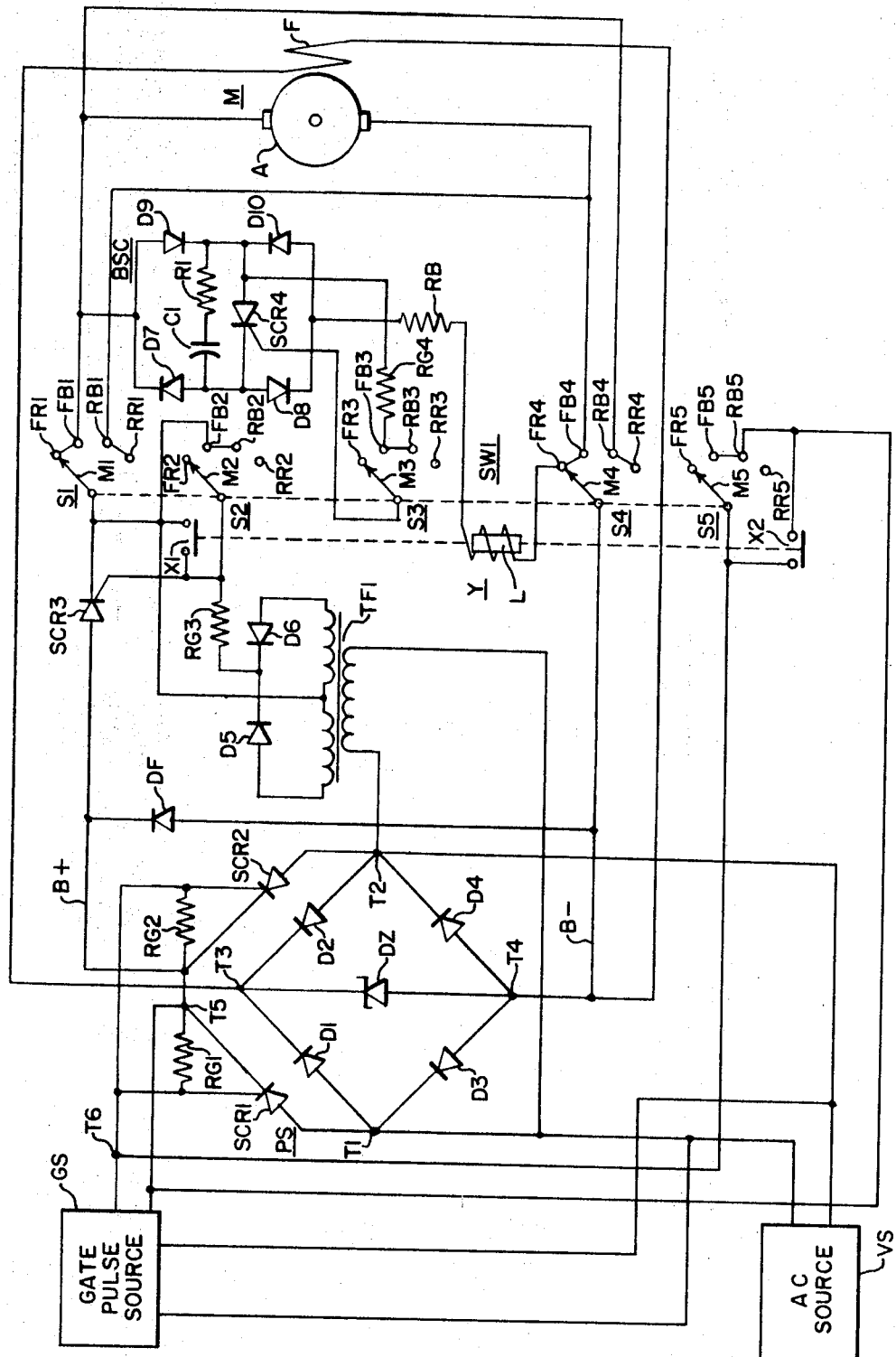

DC MOTOR REVERSING SYSTEM INCLUDING PROTECTIVE FEATURES RESPONSIVE TO REVERSING SELECTOR AND TO DYNAMIC BREAKING CURRENT

BACKGROUND OF THE INVENTION

1 Field of the Invention

The present invention relates to braking and reversing systems for reversible motors and, more particularly, to such systems supplied from phase control rectified AC.

2. Discussion of the Prior Art

A common method of supplying the energizing power for a DC motor is through phase controlled rectified AC wherein controlled rectifiers in a bridge array are fired at selected phase angles of the input alternating current sinusoidal waveform for controlling the DC output of the bridge array to be supplied to the motor. In such systems, where it is desired to run the DC motor in both directions, some means for reversing the current flow through the motor must be provided. Also it is highly desirable to provide some means for dynamically braking the motor to zero speed before the reversing operation is effected to protect the motor, the controlled rectifiers and other components from damage due to excessive current. The most obvious technique for reversing the motor is to utilize a simple switch between the bridge array power supply and the motor and to rely upon the operator to see that the motor has stopped before reversing the switch. Alternately a more complex switch may be utilized which is fitted with an interlock to prevent reverse from being selected while the motor is braking. Also the switch may be fitted with a complex detent only to insure that reverse cannot be selected directly but only after a sequence of mechanical movements which take sufficient time to guarantee that the motor has stopped before the reverse position of the switch is reached. These techniques of switching are thus not foolproof and may be expensive depending upon the complexity of the switch utilized. Another method of effecting braking and reversal is to utilize a forward and a reverse contactor for establishing conductive paths for energizing the motor in the respective directions. With the use of such contactors when neither of the contactors is energized a pair of contacts thereof short the armature of the motor via a dynamic braking resistor to cause dynamic braking of the motor. It is of course necessary that the forward and reverse contactors be interlocked either mechanically and/or electrically to prevent the possibility of shorting the power supply. In addition to the reversing techniques described, the dynamic braking of a reversible DC motor may be accomplished by firing a pair of controlled rectifiers in parallel (or a single triac) connected across the armature of the motor with a resistor connected in series therewith to dissipate energy and to limit the braking current. However, since the waveform from the power supply bridge array has a very fast rise time due to the turning on of the power supply controlled rectifiers, the controlled rectifiers or triac in parallel with the motor will be subject to damage therefrom. The use of a parallel capacitor to protect the pair of controlled rectifiers or triac causes deformation of the armature voltage which results in instability of the motor control.

It would thus be highly desirable if a reversing and braking system for a motor were provided to utilize a selector switch which is not required to break full motor current and thus increase the life of the switch. It would moreover be desirable if a switching system could be provided which requires no mechanical or electrical interlocks to prevent reversing of the switch itself before the motor has stopped since such interlocks or detent mechanisms are expensive and not completely foolproof. It would also be desirable if the system could not be operated destructively due to incorrect switching sequences or the rapid operation of the reversing switch thereof. In addition, it would be desirable if the system could be protected from damage due to the rapid rise time of the waveforms supplied from the controlled rectifiers of the power supply bridge array.

SUMMARY OF THE INVENTION

Broadly the present invention provides a braking and reversing system wherein braking and reversal is effected by a selector switch which causes the power supply to be disengaged from the motor and means are provided to maintain the disengagement until the motor has completely stopped regardless of the position of the switch.

BRIEF DESCRIPTION OF THE DRAWING

The single FIG. is a schematic block diagram of the braking and reversing system of the present invention.

DESCRIPTION OF THE PREFERRED EMBODIMENTS

Referring to the FIG., the braking and reversing system of the present invention is shown for braking and reversing a reversible DC motor which includes an armature A and a field winding F. The system is driven from an AC source VS, which may comprise a 60 Hz. sinusoidal output of a suitable voltage level, for example, 220 volts RMS. The output of the AC source VS is supplied to input terminals T1 and T2 of a bridge array power supply PS. The bridge array includes four diodes D1, D2, D3 and D4 connected in a standard full wave rectifier bridge configuration. A thyrector Dz is connected across the output of the diode bridge array between terminals T3 and T4 in order to limit voltage transients thereacross. The field winding F of the motor M has its respective ends connected to the terminals T3 and T4 so that a full wave rectified DC output is provided thereto for the field energization of the motor M.

Also included in the bridge array power supply PS is a pair of power controlled switching devices SCR1 and SCR2, which may comprise silicon controlled rectifiers or thyristors. The device SCR1 connected from anode to cathode between the terminal T1 and the output terminal T5, and the device SCR2 is connected between the terminal T2 and the output terminal T5. The terminal T5 defines the output terminal of the phase controlled bridge for supplying direct current to the armature A of the motor M. The gate electrodes of the controlled switching devices SCR1 and SCR2 are commonly connected to receive the output of a gate pulse source GS from a terminal T6. Gate resistors RG1 and RG2 are, respectively, connected between the gate and cathode electrodes of the devices SCR1 and SCR2. The gate pulse source GS receives the output of the AC source VS as an input thereto and is responsive to supply gating pulses at the output terminal T6 at a predetermined phase angle of each half cycle of the AC output of the AC source VS. By controlling the phase angle in each half cycle of the AC of the source VS, the time at which the gate pulse source GS supplies a gating pulse to the gate electrodes of the controlled switching devices SCR1 and SCR2 controls the conductive period of each of the power devices SCR1 and SCR2. In this manner the amplitude of the DC voltage developed across the bridge array between the terminals T5 and T4 can be controlled. Such gate pulse sources as the source GS, capable of supplying gating pulses at a selected phase angle of an AC waveform supplied thereto are well known in the art and will not further be described herein.

A positive bus B+ is connected to the upper terminal T5, and negative bus B− is connected to the terminal T4. The voltage difference between the output busses B+ and B− is thereby controlled by selecting the phase angle in each half cycle of the AC output at which the devices SCR1 and SCR2 are turned on, so that these are conductive for either a longer or a shorter portion of each half cycle so as to increase or decrease, respectively, the direct current output of the power supply PS between the positive and negative busses B+ and B−

The B+ bus is connected to the anode of a series controlled switching device SCR3, which may comprise a silicon controlled rectifier or thyristor. The cathode of the series device SCR3 is connected to a first section, S1 of a mechanical selector switch SW1. The switch SW1 includes five sections, namely S1, S2, S3, S4 and S5. Each of the switch sections S1, S2, S3, S4 and S5 includes a movable contact M1, M2, M3, M4 and M5, respectively, and four fixed contacts FR1, FB1, RB1, RR1, FR2, FB2, RB2, RR2..., respectively. The designation FR1 indicates the forward run position; FB indicates the forward brake position; the designation RB indicates the reverse brake position and the designation RR indicates the reverse run position. The movable contacts M1 to M5 are mechanically ganged together so that each movable contact is moved to the corresponding fixed contact position for each of the switch sections S1—S5. As indicated on the figure the motor M is in its forward run position with movable contacts M1—M5 of each of the switch sections S1—S5 connected to the fixed contact FR1—FR5, respectively. In the forward run position the series SCR3 is normally conductive with gate drive being supplied thereto from a gate supply including a transformer TF1, a pair of diodes D5 and D6 and a gate resistor RG3. A primary winding of the transformer TF1 is connected across the input terminals T1 and T2 of the bridge array. The diodes D5 and D6 are connected across the center tapped secondary winding of the transformer TF to full wave rectify the secondary voltage. The gate resistor RG3 is connected between commonly connected cathodes of the diodes D5 and D6 and the gate electrode of the series SCR3. The cathode electrode of the series SCR3 is connected to the center tapped secondary winding of the transformer TF1. Thus during forward run operation gating current is supplied to the gate-cathode circuit of the series SCR3 via the resistor RG3. A pair of relay contacts X1 is connected between the gate and cathode of the series SCR3 and normally is in the open position when the selector switch SW1 is in its forward run position. The gate of the series SCR3 is also connected to the movable contact M2 of the switch section S2 and the cathode is connected to the fixed contacts FB2 and RB2. In the forward run position this does not affect the normally conductive state of the series SCR3.

In the forward run position current is supplied to the armature A from top to bottom in the FIGURE from the B+ bus to the series SCR3, contacts M1—FR1 of the switch section S4 to the B— bus. A free wheeling diode DF is connected across the output of the power supply PS from anode to cathode between the B— and B+ busses. The freewheeling diode DF is required to ensure that the bridge controlled rectifier devices SCR1 and SCR2 commutate off at the end of their respective positive and negative conductive cycles of the AC source PS. Since the armature A includes an inductive impedance, at the end of each half cycle the current therethrough wants to keep flowing the previously established path. If the freewheeling diode DF were not present in the circuit, due to the inductance of the armature A, current would tend to continue to flow through the SCR1 at the end of the positive half cycle preventing it from commutating and thus the device SCR1 would continue to conduct during the negative half cycle along with the SCR2 which is normally conductive. During the next positive half cycle turned on at the phase angle, the SCR1 would be immediately conductive at the beginning of the half cycle rather than being delayed and turned on at the phase angle determined by the gate pulse service PS; therefore causing excess current to pass therethrough and also through the series SCR3 and the armature A. The connection of the freewheeling diode DF between the positive and negative busses B+ and B— provides a shunt path for the current caused by the stored energy in the armature A. Thus, at the end of the half cycle current from the armature A is shunted through the freewheeling diode DF rather than passing through one of the diodes D3 of D4 and the SCR1 and SCR2, respectively, which is to be commutated off at that half cycle. This permits respective devices SCR1 or SCR2 to be commutated off and be reset to be in condition to be turned on during the next half cycle that it is to be conductive at the selected phase angle as determined by the gate pulse source GS.

If it is now desired to stop the motor M or to break it to zero speed for reversing, the selector switch SW1 is switched to the forward brake (FB) position wherein the movable contacts S1—S5 are moved to engage the fixed contacts FB1—FB5, respectively. The fixed contacts FR1 and FB1 for switch section S1 and FR4 and FB4 for section S4 in series with the armature A form a single continuous contact in the respective sections so that moving the movable contacts M1 and M4, respectively, therealong does not break the electrical current path to the armature A when moving from the forward run to the forward brake position and therefore presents no arcing problem.

By engaging the movable contact M5, which is connected to the terminal T6 of the gate pulse source G2, and the fixed forward brake contact FB5, this causes the output of the gate pulse source to be shorted and therefore not applied to the gate electrode of the power controlled switching devices SCR1 and SCR2. Therefore, if either of these devices is conductive at the time the selector switch SW is moved it is commutated off at the end of the half cycle. Both devices SCR1 and SCR2 remain turned off since no further gating pulses are applied thereto. This causes the AC source VS to be disengaged from the positive and negative busses B+ and B— and hence from the armature A.

The operation of the switch section S2 to connect the movable arm M2 and the fixed contact FB2 shorts the gate and cathode electrodes of the series SCR3 thus removing the gate drive therefrom, with the series SCR3 being commutated off in that the cathode is rendered positive with respect to the anode.

A dynamic braking and sensing circuit BSC is connected across the armature A. This circuit includes a bridge circuit including a pair of diodes D7 and D8 connected in one leg thereof and a pair of diodes D9 and D10 connected in the other leg thereof. The diodes in each of the legs are oppositely poled so that a positive voltage always appears at the common cathode connection of the diodes D9—D10 independently of the direction of operation of the motor M. A brake controlled switching device SCR4, which may comprise a silicon controlled rectifier or thyristor is connected with its anode to the common cathode connection of the diodes D9—D10 and its cathode to a common anode connection of the diodes D7—D8. An RC circuit including a capacitor C1 and a resistor R1 is connected between the legs of the bridge circuit across the brake SCR4. During forward or reverse run operation of the motor M, the capacitor C1 will charge to substantially the B+ potential on the right side thereof as indicated on the FIGURE. The brake SCR4 is nonconductive during the forward or reverse run operation of the motor M with the gate electrode thereof being connected to the movable arm M3 of the switch section S3 and the fixed contacts FR3 and RR3 being electrically isolated. In the FR3 or RR3 positions of the switch section S3, no gate drive is thus provided to the brake SCR4. However, when it is desired to brake the motor M to a stop, the movement of the movable contact M3 to the fixed contact FB3 causes a gating voltage to be applied to the gate electrode of the SCR4 via a resistor RG4 which is connected between the anode of the SCR4 and the fixed contacts FB3 and RB3 which form a common contact. This thus turns on the SCR4 so that a current path is provided therethrough and through a brake resistor RB and a relay coil L of a relay Y which are connected in series between the bottom end of the bridge circuit and the bottom end of the armature A at the B— bus. With the firing of the brake SCR4 a current path is provided through the relay coil L, the brake resistor RB, the diode D8, the SCR4, the diode D9 to the other end of the armature A. This causes dynamic braking of the motor and the kinetic energy stored within the armature A being dissipated in the brake resistor RB to thereby dynamically brake the motor M to a stop position.

It should be noted that since the series SCR3 is commutated off by the moving of the switch section S2 to the forward brake position no large current flow is permitted to pass through the switch sections S1 and S4 and the freewheeling diode DF which might otherwise cause damage to the freewheeling diode DF and the armature A if an uncontrolled current were permitted to flow therethrough.

Flow of current through the relay coil L causes activation of the relay Y which includes two pairs of contacts X1 and X2 which are normally open when the selector switch SW1 is in the forward or reverse run positions. The pair of contacts X1 are connected across the cathode-gate circuit of the series SCR3 to ensure that this controlled switch device is maintained off whenever the brake SCR4 is conducting to energize the relay coil L. The other set of contacts X2 is connected across the output of the gate pulse source GS to ensure that no gating pulses are applied to the controlled switch devices SCR1 and SCR2 whenever the bridge SCR4 and relay coil L are conducting current. The relay Y is designed to be a fast operating relay having an operating time of for example less than 10 milliseconds. The relay Y thus senses that braking of the motor M is in progress and prevents gating pulses from being applied to the power devices SCR1 and SCR2 to maintain them off and also maintains the series SCR3 off until the braking operation has been completed and the motor M has stopped.

The above-described braking operation takes place regardless of the switch position selected for the selector switch SW1 since the movement of the switch SW1 through the forward or brake positions causes the very rapid turnoff of the power devices SCR1 and SCR2 and also the series SCR3 which thereby isolate the power supply PS from the motor M. Also the brake SCR4 is fired which causes the activation of the fast operating relay Y assuring that the power devices SCR1 and SCR2 and the series SCR3 are not permitted to turn on again until the braking operation has been completed. The turning off of the power supply devices SCR1 and SCR2 and the series device SCR3 is accomplished within the first half cycle, after the selector switch is moved to or through the brake position. The fast operation relay Y operates in approximately 1 millisecond from the energization of the relay coil L. Thus, regardless of what position is selected by the operator from a run condition in the speed at which he mechanically moves the selector switch SW1, the power supply devices SCR1 and SCR2 and the series device SCR3 have been commutated off and mounted off before the opposite direction of run condition for the motor can be effected in the system. For example, if the switch SW1 would be switched from the forward run (FR) through the forward brake (FB) position to the reverse brake (RB) position, current would still be maintained through the brake SCR4, the brake resistor RB and the relay coil L to continue the braking operation. If the switch SW1 should be further switched to the reverse run (RR) position, during the braking operation in that the relay contacts X2 short the gate pulses GS and also the contact X, shorts the gate of the series SCR3, no input energy can be supplied to the motor M until the current through the armature A thereof has stopped with the stopping of the motor. Once the current through the armature A has gone to zero, the brake SCR4 stops conduction and the relay coil L will be deenergized with the contacts X1 and X2 returning to their open state.

Once the motor has stopped, the reverse run position respective switch sections S1—S5 being set in the RR1—RR5 positions. This causes the reverse connection of the B and B— busses via the switch sections S1 and S4 whereby the current direction is reversed through the armature A and the motor rotates in the opposite direction. It should be noted that the bus reversing switching operation occurs at a zero current condition so that the switch sections S1 and S4 are not required to switch any current and therefore to be of a high economical design due to not being required to have a current switching rating.

Moving the switch section S5 to the RR5 position removes the short from across the gate pulse source permitting gate drive to be supplied via the terminal T6 to the gate electrodes of the devices SCR1 and SCR2 thereby again energizing the B+ and B— busses. The series SCR3 is turned on by the placing of the switch section S2 in the RR2 position so that gate drive is provided thereto via the transformer TF1. The placing of the switch section S3 in the RR3 position removes gate drive from the brake SCR4 with the capacitor C1 again charging to the positive polarity as indicated. The capacitor C1 charges to the peak supply voltage and prevents fast rise voltages caused by the turning on of the devices controlled SCR1 and SCR2 at the selected phase angle of the AC source VS from being impressed across the brake SCR4 which could be damaging thereto. The reversing of the motor M is thus completed and continues with the braking and sensing circuit BSC being reset for the next braking or reversal operation.

The capacitor C1 has an additional advantage since it is charged during both forward and reverse run operation of the motor. For example, if the AC source VS should be disconnected from power supply PS and the switch SW1 moved to the reverse run position while the motor is still running in the forward direction and then the AC source reapplied, the motor M will still brake to zero speed before reversing since the capacitor C1 would supply sufficient voltage to fire the SCR4 and provide conductive paths to the relay coil L which would prevent the reenergization of the armature A, until the motor has completely braked to zero after which time the reversal operation could be effected.

Although the present invention has been described with a certain degree of particularity, it should be understood that the present disclosure has been made only by way of example and that numerous changes in the details of construction and the combination of parts and elements can be resorted to without departing from the spirit and scope of the present invention.

We claim:
1. In a braking and reversing system for a reversible motor having a motor winding operative to reverse the motor upon the reversal of power supplied thereto, the combination of:
   A. a controlled power supply including AC input terminals for the reception of AC, first and second DC output terminals, and AC to DC conversion means including controlled rectifiers for converting said AC to DC and providing an adjustable DC output at said DC output terminals;
   B. a selector switch including a plurality of switch sections, each of said switch sections including a plurality of positions defining run and brake positions for said motor;
   C. first and second of said switch sections each having first and second terminals connected to opposite sides of said motor winding, and a third terminal which is selectively connectable to either of the first and second terminals of the same switch section;
   D. first circuit means for connecting the first DC output terminal to the third of the first switch section;
   E. second circuit means for connecting the second DC output terminal to the third terminal of the second switch section;
   F. a discharge path connected across the third terminals of the first and second switch sections for discharging stored energy of said motor winding; said discharge path having a freewheeling unidirectional circuit portion connected across said DC output terminals and poled in the same direction as said controlled rectifiers, said discharge path including in series therein a controlled switching device;
   G. a braking and sensing circuit operatively connected across said motor and including a dynamic braking resistor, controlled bilateral switching means which when conductive is operable to pass dynamic braking current from said motor winding through said resistor, and brake current sensing means operable in a first mode in response to flow of dynamic braking current, and in a second mode in the absence of dynamic braking current flow;
   H. means for rendering said bilateral switching means conductive in response to said selector switch being moved from a run to a brake position, once rendered conductive said bilateral switching means maintaining conduction until the motor substantially stops and braking current drops to substantially zero regardless of the position of said selector switch;

I. means for preventing said power supply from supplying an output in response to said selector switch being moved from a run to a brake position and in response to operation of the brake current sensing means in its first mode; and J. means for rendering said controlled switching device nonconductive in response to the selector switch being moved from a run to a brake position and in response to operation of the brake current sensing means in its first mode.

2. The combination as in claim 1 wherein said freewheeling unidirectional portion of the discharge path comprises a freewheeling diode, and said controlled switch device is connected in series in said first circuit means.

3. The combination as in claim 1 wherein said bilateral switching means comprises a rectifier bridge having a controlled rectifier connected across the unidirectional diagonal, the other diagonal of the bridge being connected to the circuit controlled by the bilateral switching device.

4. The combination as in claim 3 wherein a circuit including a capacitor is connected across said controlled rectifier in the rectifier bridge.

5. The combination as in claim 1 wherein said brake current sensing device comprises a relay having (a) first and second sets of contacts for respectively affecting the operation of said controlled switch device and the controlled rectifiers of said power supply, and (b) operating means responsive to said braking current for operating said first and second sets of contacts.

6. In a braking and reversing system for a reversible motor operative with a controlled power supply, the combination of:
a selector switch including first, second, third, fourth and fifth switch sections, each section including forward and reverse run positions and forward and reverse brake positions,
a first controlled switching device controllable by said first switch section;
said power supply and said motor being operatively connected by said first controlled device and second and third switch sections;
a braking and sensing circuit operatively connected across said motor and including (a) a second controlled switching device controllable by said fourth switch section, (b) a braking element, and (c) an electromechanical device;
said fifth section being operative to control the output of said power supply;
in response to said selector switch being moved from a run position to a brake position, said power supply being deactivated from supplying an output, said first controlled device being rendered nonconductive and said second controlled device being rendered conductive to energize said braking element to dynamically brake said motor and to energize said electromechanical device to prevent said power supply from providing an output and said first controlled device from being turned on regardless of the position of said selector switch until said motor has been substantially completely braked.

7. The combination of claim 6 wherein:
said electromechanical device includes a first and a second pair of contacts operative to be respectively closed in response to the energization of said electromechanical device, said first pair of contacts operatively connected to said fifth switch section and operative to prevent said power supply from supplying an output and said second pair of contacts operatively connected to said first switch section and operative to prevent said first controlled device from being turned on.

8. The combination of claim 7 wherein:
said electromechanical device comprises a fast acting relay including said first and second pair of contacts.

9. In a braking and reversing system for a reversible motor operative with a controlled power supply, the combination of:
a selector switch including a plurality of switch sections, each of said switch sections including a plurality of positions defining run and brake positions for said motor;
a first controlled switching device;
said power supply and said motor being operatively connected by said first-controlled device and selected of said switch sections;
a braking and sensing circuit operatively connected across said motor and including a second controlled switching device, a braking element and an electromechanical device;
in response to said selector switch being moved from a run position to a brake position, said power supply being deactivated from supplying an output, said first controlled device being rendered nonconductive and said second controlled device being rendered conductive to energize said braking element to dynamically brake said motor and to energize said electromechanical device to prevent said power supply from providing an output and said first controlled device from being turned on regardless of the position of said selector switch until said motor has been substantially completely braked;
said braking and sensing circuit including a rectifier bridge circuit and a capacitor, said second controlled device being connected in said bridge circuit and responsive to be fired when said selector switch is moved from a run to a brake position regardless of the direction of running of said motor, said capacitor being connected across said second controlled device to prevent voltages having excessively high rates of rise from being applied thereto.

10. The combination of claim 9 wherein said controlled power supply is supplied from an AC source to provide a DC output and includes other controlled switching devices receiving gating pulses from a gate pulse source to determine the DC output of said power supply and wherein:
said fifth section of said selector switch is operatively connected to said gate source to prevent the application of gating pulses to said other controlled switching devices when said selector switch is moved from a run to a brake position,
said first pair of contacts of said electromechanical device is operatively connected to said gate pulse source to prevent the application of gate pulses to said other controlled switching devices until said motor has been substantially completely braked regardless of the position of said selector switch.

11. The combination of claim 10 includes:
a freewheeling diode operatively connected across the DC output of said other supply to permit said power controlled switching devices to be commutated off at the end of the respective half cycles of said AC source,
when said first controlled device is rendered nonconductive said freewheeling diode is isolated thereby with current through said motor being transferred to said braking and sensing circuit.

12. The combination of claim 10 wherein:
said braking and sensing circuit includes a rectifier bridge circuit, said second controlled device being connected in said bridge circuit and is responsive to be fired when said selector switch is moved from a run to a brake position regardless of the direction of running of said motor.

13. The combination of claim 12 wherein:
said braking and reversing circuit includes a capacitor operatively connected across said second controlled device to prevent voltages having excessively high rates of rise from being applied thereto.